United States Patent [19]

Anderson et al.

[11] 4,160,194

[45] Jul. 3, 1979

[54] SYSTEM AND METHOD FOR KEYING VIDEO INFORMATION TO ELECTRON BEAM DEFLECTION

[75] Inventors: Charles H. Anderson, Rocky Hill; Frank J. Marlowe, Kingston, both of N.J.

[73] Assignee: RCA Corporation, New York, N.Y.

[21] Appl. No.: 770,511

[22] Filed: Feb. 22, 1977

[51] Int. Cl.² ............................................. H01J 29/70
[52] U.S. Cl. .................................. 315/366; 315/12 ND
[58] Field of Search ................ 315/366, 12 I; 313/422

[56] References Cited

U.S. PATENT DOCUMENTS

| | | | |
|---|---|---|---|
| 2,736,764 | 2/1956 | Bingley | 315/12 I X |
| 2,904,722 | 9/1959 | Aiken | 315/366 X |
| 3,147,340 | 9/1964 | Ehrich | 315/12 I X |

Primary Examiner—Malcolm F. Hubler
Attorney, Agent, or Firm—Eugene M. Whitacre; George E. Haas; Vincent J. Coughlin, Jr.

[57] ABSTRACT

In an image display, the video information may be keyed to the position of the electron beam by sensing the beam deflection voltage. A keying system utilizes means for generating a reference voltage which is proportional to the anode voltage and means for comparing the reference voltage to the deflection voltage for the electron beam. When a predetermined relationship between the two voltages, such as equality, is reached; the comparing means produces an output which indicates the deflected position of the electron beam. The output of the comparing means can be used to switch the video information to modulate the electron beam.

6 Claims, 2 Drawing Figures

SYSTEM AND METHOD FOR KEYING VIDEO INFORMATION TO ELECTRON BEAM DEFLECTION

BACKGROUND OF THE INVENTION

The present invention relates to a system for keying video information to the electron beam deflection voltage and has particular application in cathodoluminescent display devices for determining the position of the beam.

In many display devices, such as conventional cathode ray tubes and more recently in flat image display devices which utilize a plurality of electron beams, it becomes necessary to key the video information to the position of the electron beam. This keying enables the modulation of the electron beam at the precise instant of time for the activation of a specific phosphor element on the display screen. Heretofore, when the position of the electron beam had to be sensed, a plurality of electrodes were incorporated on the screen. The scanning of the electrodes by the electron beam charged the electrodes which was sensed, thereby indicating the instantaneous position of the electron beam. The use of such sensing electrodes, however, necessitates a modification in the display device, be it a cathode ray tube or a flat image display device, by incorporating the number of electrodes on the screen as well as the number of leads through the envelope of the device.

SUMMARY OF THE INVENTION

A system for keying video information to the electron beam deflection comprises means for generating a reference voltage which is proportional to the anode voltage and means for comparing the reference voltage to the deflection voltage for the electron beam. The exact position of the electron beam for various deflection voltage levels can be calculated or determined experimentally. Thereafter, by comparing the deflection voltage to known reference voltages, the beam's position can be determined. This comparison of the deflection voltage to the reference voltage can then be utilized to switch the video information to modulate the beam for given picture elements.

DETAILED DESCRIPTION OF THE PREFERRED EMBODIMENT

Figure 1:
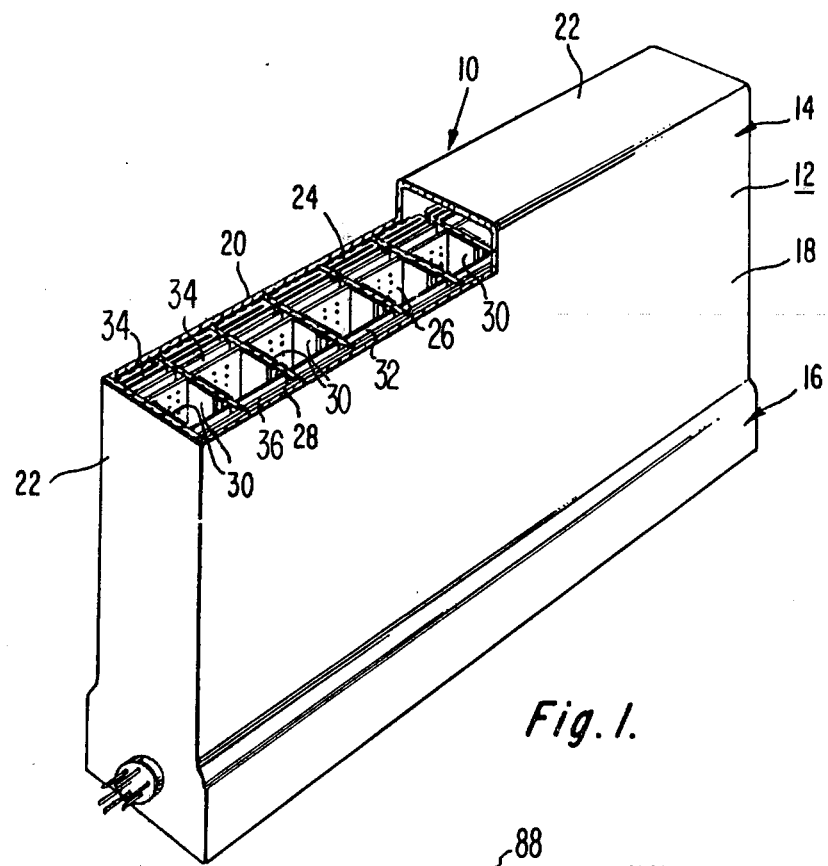
FIG. 1 is a cut-away perspective view of a flat image display device in which the present system for keying video information may be used.

Referring initially to FIG. 1, a flat display device including the video keying system of the present invention is generally designated as 10. The display device 10 includes an evacuated envelope 12 typically of glass, having a display section 14 and an electron gun section 16. The display section 14 includes a rectangular front wall 18, which is the viewing screen, and a rectangular back wall 20 in a spaced parallel relation to the front wall 18. The front and back walls 18 and 20, respectively, are connected by sidewalls 22.

A plurality of spaced, substantially parallel support walls 24, made of an electrically insulating material such as glass, are secured between the front wall 18 and the back wall 20 and extend from the gun section 16 to the opposite sidewall 22 of the envelope 12. The support walls 24 provide internal support for the evacuated envelope 12 against external atmospheric pressure and divide the display section 14 into a plurality of channels 26. On the inner surface of the front wall 18, in each of the channels 26 is a phosphor screen 28. For a black and white display, the phosphor screen 28 is of any well known composition used in black and white display devices. For a color display, the phosphor screen 28 is preferably made of alternating stripes of conventional phosphor compositions which emit red, green, and blue light when excited by electrons. A shadow mask 32 extends across each of the channels 26 adjacent the space from the front wall 18. The display device is similar to that described in a co-pending application of T. Credelle Ser. No. 607,490, filed Aug. 25, 1975, entitled "Flat Display Tube With Beam Guide," now U.S. Pat. No. 4,103,204.

Within each channel on the surface of both the support walls forming the channels are two deflection electrodes 30. Both of the deflection electrodes 30 on the same support wall 24 but in adjacent channels 26 are electrically connected to one another. During the operation of the device, electron beams are generated in the gun section 16 and travel up each channel 26 in beam guides 34 adjacent to the back wall 20. Extract electrodes on the beam guides 34 deflect the beams at right angles toward the screen 28. The deflection electrodes then are utilized to deflect the beam horizontally to the correct position on the screen 28. The electron beams in each of the channels 26 are simultaneously scanning a line of the displayed image. In order to reduce the capacitance between the two deflection electrodes 30 on opposite surfaces of the same support wall 24, the electrodes 30 have been interconnected to be at the same electrical potential. Therefore, the electron beams in adjacent channels 26 scan in opposite directions, i.e., the electron beam in the first channel 26 scans left to right while the electron beam in the second channel scans right to left and so on. This alternating scanning scheme has been described in a co-pending application of F. J. Marlowe Ser. No. 691,397 filed June 1, 1976 entitled "A Modular Type Guided Beam Flat Display Device."

As noted previously, during a line scan time, each electron beam simultaneously scans the portion of the line within its respective channel. Therefore, conventional sequential video signals such as the NTSC standard cannot be fed directly into the display. Instead, various memories have been suggested to store an entire display line so segments of the line can be fed in parallel to the electron gun in each channel. Such a scan converter is described in U.S. patent application Ser. No. 740,770 entitled "Line Scan Converter for Flat Image Display Device" filed on Nov. 10, 1976 by F. J. Marlowe, RCA, now U.S. Pat. No. 4,080,630, issued Mar. 21, 1978. The present keying system is employed to clock the signal out of such memories. In addition, since the entire image is made up of a number of segments side by side, each image must be horizontally spatially registered on the screen with respect to the other images. If one image segment was to drift spatially with respect to the other segments, an image discontinuity would occur.

Figure 2:
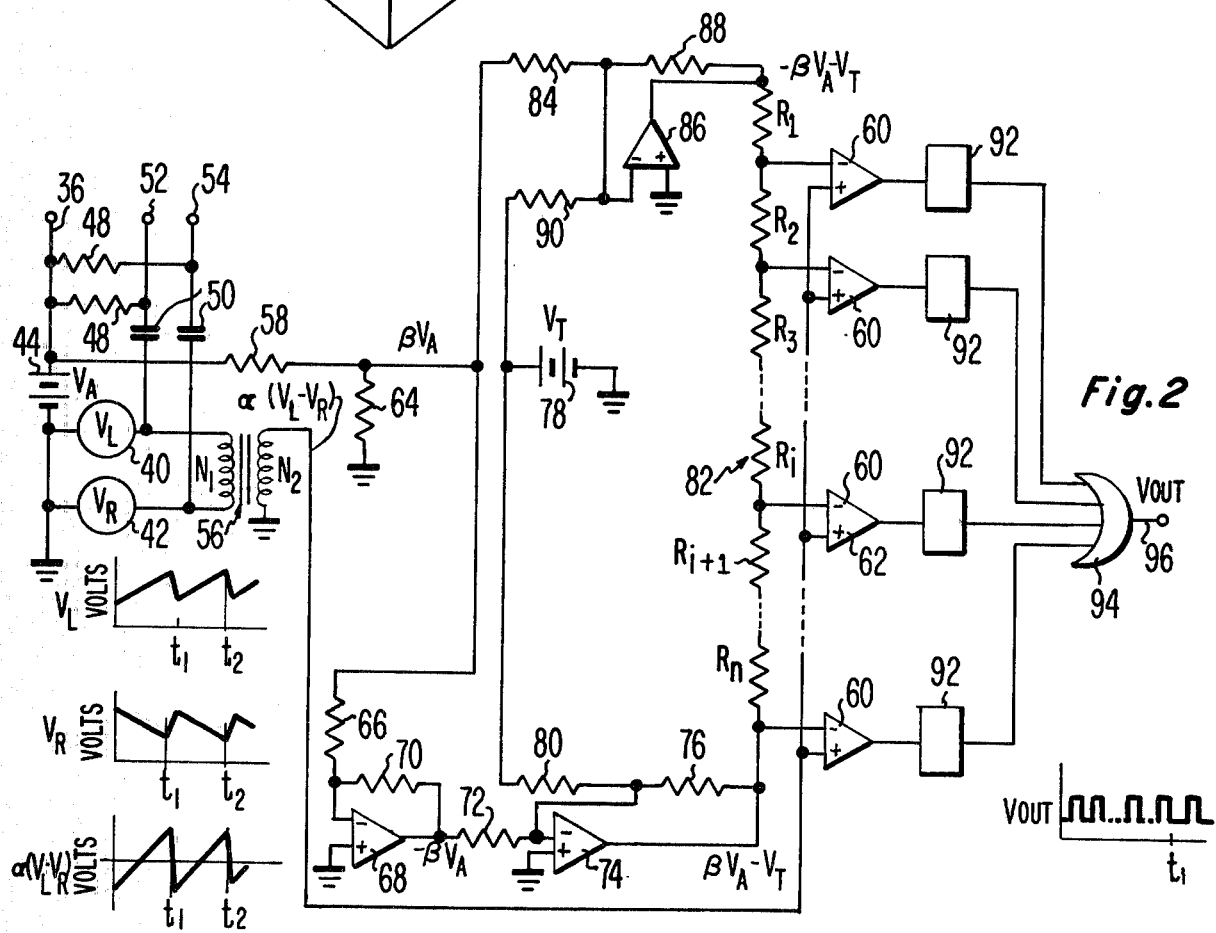
FIG. 2 is a schematic diagram of a circuit for keying video information.

Turning our attention to the circuit in FIG. 2, the deflection voltages for scanning the beam are produced by two saw-tooth wave generators 40 and 42 generating saw-tooth voltages $V_L$ and $V_R$, respectively. The first saw-tooth wave generator 40 produces a positive going saw-tooth voltage waveform shown on the insert graph in FIG. 2. The second saw-tooth wave generator 42 produces a saw-tooth voltage waveform which is negative going. An anode voltage source 44 produces a voltage $V_A$ which biases the anode 36. The first and second saw-tooth wave generators 40 and 42 are AC coupled to the anode voltage $V_A$ by a pair of first resistors 48 and capacitors 50. The AC coupling produces a high voltage saw-tooth waveform proportional to the first saw-tooth voltage $V_L$ at terminal 52 and a second high voltage saw-tooth waveform proportional to $V_R$ at a second terminal 54. The first and second terminals 52 and 54 are connected to the deflection electrodes on alternating support walls 24 so that within each guide, one deflection electrode will be at a voltage proportional to $V_L$ while the other deflection electrode will be at a voltage proportional to $V_R$.

The remainder of the circuitry in FIG. 2, is utilized to key the video information to the various deflection voltages generated by the first and second saw-tooth generators 40 and 42. The outputs of the two saw-tooth wave generators 40 and 42 are connected to the primary of a transformer 56. The output of the secondary of the transformer 56 is proportional by a factor $\alpha$ to $(V_L - V_R)$. The output from the transformer 56 is coupled to the non-inverting inputs of a plurality of comparators 60.

A second resistor 58 has one terminal connected to the positive anode voltage $V_A$ and the other terminal connected to ground potential via a third resistor 64. The combination of the second and third resistors 58 and 64 respectively, forms an anode voltage divider which produces a voltage level $\beta V_A$, proportional to the anode voltage, at the other terminal of the second resistor 58. The voltage $\beta V_A$ is coupled by a fourth resistor 66 to the inverting input of a unity gain inverter 68. The non-inverting input of the unity gain inverter 68 is connected to ground and a first feedback resistor 70 couples the output of the first inverter 68 to its inverting input. The output of the first inverter 68 is a voltage $-\beta V_A$.

The output of the first inverter 68 is coupled via a fifth resistor 72 to the inverting input of a second unity gain inverter 74. A second feedback resistor 76 couples the output of the second inverter 74 to its inverting input. A biasing voltage source 78 produces a voltage level $V_T$ which is connected via a sixth resistor 80 to the inverting input of the second unity gain inverter 74. The output of the second inverter 74 is a voltage level $\beta V_A - V_T$. This output from the second inverter is connected to one end of a voltage divider network generally designated as 82 composed of resistors $R_1$-$R_N$. The voltage divider 82 has taps at various voltage levels which provide reference voltages to the inverting inputs of the plurality of camparators 60.

The scaled down anode voltage $\beta V_A$ is also connected via a seventh resistor 84 to the inverting input of a third unity gain inverter 86. The inverting input of the third unity gain inverter 86 is also connected to its output via a third feedback resistor 88 and also to the biasing voltage source 78 via an eighth resistor 90. The output of the third unity gain inverter 86 is a voltage level $-\beta V_A - V_T$ which is connected to the other end of the voltage divider network 82.

The output of each of the comparators 60 is connected to the input of a separate monostable multivibrator 92. The output of each of the monostable multivibrators 92 is connected to the input of the OR gate 94. The output of the OR gate 94 is utilized to key the video information to the electron beam position. Specifically, the output from the OR gate 94 can be utilized to clock information through a scan converter such as described in U.S. patent application Ser. No. 740,770 filed on Nov. 10, 1976 by Frank Marlowe entitled "Line Scan Converter for an Image Display Device", now U.S. Pat. No. 4,080,630, issued Mar. 21, 1978.

During the scanning of each line, the first saw-tooth generator 40 produces a $V_L$ voltage wave form which increases positively in voltage during each line scan time (t) while the second saw-tooth wave generator 42 produces a $V_R$ voltage waveform which decreases in voltage during each line scan time (t). The transformer 56 subtracts $V_R$ from $V_L$ and reduces the voltage a factor $\alpha$ to make it compatable with the voltage levels for the comparators 60. The waveform $\alpha(V_L - V_R)$ produces a positive going saw-tooth waveform. As the electron beam is deflected across the screen, the voltage output of the transformer increases. Therefore, for each position on the screen to be defined along the scan of the electron beam, the output of the transformer 56 will have a unique voltage. Thus, the position of the electron beam's deflection may be determined by sensing the voltage output of the transformer 56. The correlation between the various deflection voltage levels and the position of the beam deflection can be determined either mathematically or experimentally. Thereafter, when a given voltage level is reached, it is known that the beam will be at the corresponding position. The comparators 60 compare the output of the transformer 56 to various reference voltage levels set by the voltage divider 82. The comparators produce an output when the transformer voltage equals their particular reference voltage indicating that the beam is at a given position.

The circuitry consisting of the second through the eighth resistors, the first through third inverters, and the voltage divider network 82 forms a reference voltage source for each of the comparators 60. By carefully selecting the resistances for the voltage divider network, various reference voltage levels may be obtained for the comparators and therefore various electron beam positions may be sensed. The bias voltage source 78, producing voltage level $V_T$, compensates for the time lag due to the electron transit time in the beam guides between the modulation of the beam in the electron gun section and its striking the screen. As different lines are scanned, the beam path length various as the beam is deflected toward the screen at different points. The bias voltage $V_T$ is a function of the vertical beam extraction position to compensate for the varying beam path length. The time lag compensation enables the video information to modulate the beam at the proper instant of time for the picture element which is to be illuminated. By utilizing the monostable multivibrators 92 and the OR gate 94, a pulse train $V_{out}$ is produced on output line 96 which can clock the video information into the gun modulating circuitry.

An important feature of the invention is that the determination of the electron beam position is independent of variation in the anode voltage $V_A$. As the anode voltage increases, the beam will be accelerated toward the screen at a faster rate and it will be less influenced by the electrostatic field established by the potentials on the deflection electrodes 30. Therefore the accuracy of determination of the beam position will be affected without compensating for these variations. The present circuit utilizes the instantaneous anode voltage $V_A$ in the reference voltage source and thereby incorporates the effects of fluctuation of anode voltage on the electron beam deflection into the keying system. The following equations show that the present system for keying video information to the beam position is independent of variations in the anode voltage. Specifically, the deflection position $d_i$ that causes the $i^{th}$ comparator 62 to change states is defined by the following equation:

$$d_i = \frac{l^2(V_L - V_R)_i}{4WV_A} \tag{1}$$

where:
l is the length of the electron path between deflection electrodes.
$(V_L - V_R)_i$ is the voltage difference between left and right deflection electrodes that causes the $i^{th}$ comparator to change state.
W is the width between the deflection electrodes and
$V_A$ is the anode voltage.

The output of the transformer 56 at the instant of time corresponding to the deflection position $d_i$ is given by the equation:

$$V_i = \alpha(V_L - V_R)_i = \frac{\alpha d_i 4WV_A}{l^2} \tag{2}$$

where:
α is the number of turns in the transformer secondary, $N_2$ divided by the number of turns in the transformer's primary, $N_1$.

Assuming that the voltage $V_T$ from the voltage supply 78 equals zero, the reference voltage input to the $i^{th}$ comparator, $V_i$, is given by the following equation:

$$V_i = -\beta V_A + 2\beta V_A \left( \frac{\sum_{j=1}^{i} R_j}{\sum_{j=1}^{N} R_j} \right) = \beta V_A \left( \frac{\sum_{j=1}^{i} R_j - \sum_{j=i+1}^{N} R_j}{\sum_{j=1}^{N} R_j} \right) \tag{3}$$

where:
$R_j$ are the resistors in the voltage divider network.

By definition the $i^{th}$ comparator changes state when $V_i = \alpha(V_L - V_R)_i$. From equations (2) and (3):

$$d_i = \left( \frac{\beta}{\alpha} \right) \left( \frac{\sum_{j=1}^{i} R_j - \sum_{j=i+1}^{N} R_j}{\sum_{j=1}^{N} R_j} \right) \left( \frac{l^2}{4W} \right) \tag{4}$$

Equation 4 shows the beam deflection position $d_i$ indicated by the transition of the $i^{th}$ comparator is a function of the constants of proportionality α and β, the resistors $R_j$ in the voltage divider network, and the dimensions l and W but not a function of the anode voltage $V_A$. Since all of these quantities that affect the indication are fixed, the present circuit can accurately indicate the beam position when $V_i = (V_L - V_R)_i$.

If $V_T$, the transit time delay, is not zero, equation (3) is modified to:

$$V_i = -V_T + \beta V_A \left( \frac{\sum_{j=1}^{i} R_j - \sum_{j=i+1}^{N} R_j}{\sum_{j=1}^{N} R_j} \right) \tag{5}$$

combining equations (2) and (5):

$$d_i = \frac{-l^2 V_T}{\alpha 4 W V_A} + \left( \frac{\beta}{\alpha} \right) \left( \frac{\sum_{j=1}^{i} R_j - \sum_{j=i+1}^{N} R_j}{\sum_{j=1}^{N} R_j} \right) \left( \frac{l^2}{4W} \right) \tag{6}$$

In this case, $V_T \neq 0$, $d_i$ does depend on $V_A$. However, since the transit time delay, approximately a few hundred nanoseconds, is small compared with the line scan time, approximately 60 microseconds for NTSC television, the correction factor, $(-l^2 V_T)/(\alpha 4WV_A)$ is relatively small. Therefore, to a first order, the variation of $d_i$ with $V_A$ can be considered to be negligible. In case that variation is not negligible, $V_T$ can be made proportional to $V_A$ in a number of straightforward ways such as utilizing the $V_A$ voltage source 44 as the source of $V_T$.

We claim:
1. A system for determining the position of an electron beam with respect to points on a screen of a cathodoluminescent display device, said system comprising:
means for generating at least one reference voltage proportioned to an instantaneous anode voltage; and
means for comparing a reference voltage with the electron beam deflection voltage for the display device, said comparing means including at least one comparator having one of its inputs connected to the reference voltage generating means and the other input connected to the deflection voltage and having its output connected to a monostable multivibrator.

2. A system for determining the position of an electron beam with respect to points on a screen of a cathodoluminescent display device, said system comprising:
a first voltage divider connected between the anode voltage and ground;
a first inverter having its input connected to the first voltage divider;
a second inverter having its input connected to the output of the first inverter;
a third inverter having its input connected to the first voltage divider;
a biasing voltage source connected to the input of both the second and third inverters;
a second voltage divider connected between the outputs of the second and third inverters; and
means for comparing a reference voltage with the electron beam deflection voltage for the display device.

3. The system as in claim 2, wherein the comparing means comprises:
a plurality of voltage comparators having one input connected at different points to the second voltage divider and a second input connected to the deflection voltage;

a plurality of monostable multivibrators connected to the output of a different comparator; and an OR gate having a separate input connected to the output of a different monostable multivibrator.

4. In an image display device having a cathodoluminescent screen, an anode voltage source and an electron beam deflection voltage source including two saw-tooth wave generators, a system for determining the position of an electron beam with respect to points on the screen comprising means for comparing the deflection voltage to a reference voltage directly proportioned to the instantaneous anode voltage, said voltage comparing means comprising:

a voltage divider connected to the anode voltage source;

a voltage inverter connected between the anode voltage and the voltage divider; and at least one comparator having one input connected to the deflection voltage source and another input connected to a different point along the voltage divider.

5. The device as in claim 4, wherein the voltage comparing means comprises:

a plurality of voltage comparators each having a first input connected to different reference voltages; and a transformer with a primary connected to both saw-tooth wave generators and a secondary connected to the other input of each comparator.

6. The device as in claim 4, wherein the voltage comparing means comprises:

a first voltage divider connected to the anode voltage source;

a first inverter connected to the first voltage divider;

a second inverter having an input connected to the output of the first inverter;

a third inverter connected to the first voltage divider;

a bias voltage source connected to the second and third inverters;

a second voltage divider connected between the output of the second and third inverters;

a plurality of comparators having one input connected to various points on the second voltage divider;

a transformer with a primary connected to the two saw-tooth wave generators and a secondary connected to another input of each of the comparators;

a monostable multivibrator connected to the output of a separate comparator; and an OR gate having an input connected to each monostable multivibrator.

* * * * *